United States Patent [19]

Kishimoto et al.

[11] Patent Number: 5,231,339
[45] Date of Patent: Jul. 27, 1993

[54] CONTROL DEVICE FOR INDUCTION MOTOR

[75] Inventors: Yasuharu Kishimoto; Sadao Asaba; Kenichi Nakata; Shigeo Kawatsu, all of Katsuta, Japan

[73] Assignees: Hitachi, Ltd.; Hitachi Techno Engineering Co., Ltd., both of Tokyo, Japan

[21] Appl. No.: 670,728

[22] Filed: Mar. 18, 1991

[30] Foreign Application Priority Data

Mar. 16, 1990 [JP] Japan .................................. 2-64241

[51] Int. Cl.$^5$ .............................................. H02P 5/40
[52] U.S. Cl. .................................. 318/807; 318/809; 363/37
[58] Field of Search ................ 318/634, 685, 788, 798, 318/799, 800, 801, 802, 803, 805, 807, 808, 809, 811, 812; 363/41, 37

[56] References Cited

U.S. PATENT DOCUMENTS

| | | | |
|---|---|---|---|
| 3,917,989 | 11/1975 | Bereisa, Jr. .......................... | 318/801 |
| 4,011,489 | 3/1977 | Franz et al. ......................... | 318/798 |
| 4,315,203 | 2/1982 | Ibamoto et al. ..................... | 318/807 |
| 4,327,315 | 4/1982 | Kawada et al. ..................... | 318/803 |
| 4,437,051 | 3/1984 | Muto et al. ......................... | 318/808 |
| 4,668,157 | 5/1987 | Kato et al. .......................... | 318/634 |
| 4,804,067 | 2/1989 | Kahkipuro .......................... | 318/807 |
| 4,862,343 | 8/1989 | Nomura et al. ..................... | 363/41 |
| 4,926,077 | 5/1990 | Gauthier et al. .................... | 318/634 |
| 5,010,287 | 4/1991 | Mukai et al. ....................... | 318/812 |

FOREIGN PATENT DOCUMENTS 57-13989 1/1982 Japan .
1490740 12/1974 United Kingdom .

OTHER PUBLICATIONS

Technical Report of the Institute of Electrical Engineers of Japan (II), No. 109, p. 39.

Primary Examiner—William M. Shoop, Jr.
Assistant Examiner—John W. Cobeca
Attorney, Agent, or Firm—Antonelli, Terry, Stout & Kraus

[57] ABSTRACT

In a slip frequency control system hitherto widely employed as a control system for an induction motor type electric rolling stock (in which a slip frequency is determined from a current deviation, an inverter frequency is calculated from the slip frequency and a motor rotation frequency, and the inverter frequency is multiplied by a predetermined correction factor to determine a modulation rate, thereby operating an inverter), a motor output torque decreases in a low speed region. It is difficult to make the correction for this decrease of torque by detecting the torque. In the present invention made considering that a torque curve and sin $\phi$ ($\phi$: the internal impedance angle of a motor) obtained from the result of simulation resemble each other, the decrease of sin $\phi$ is regarded as being the decrease of torque and a voltage to frequency ratio is corrected so as to compensate for the decrease of sin $\phi$.

9 Claims, 16 Drawing Sheets

F I G. 1
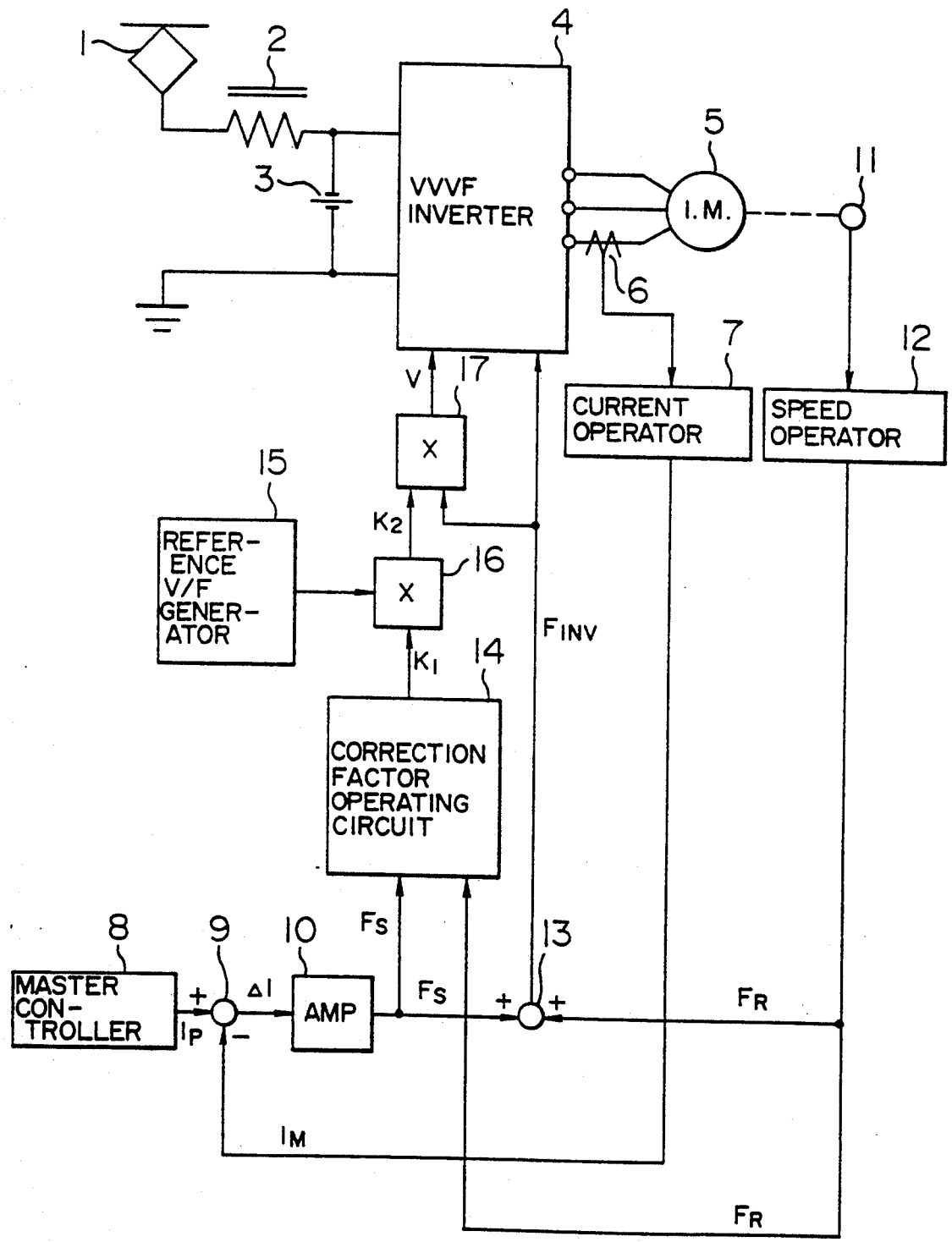

F I G. 4
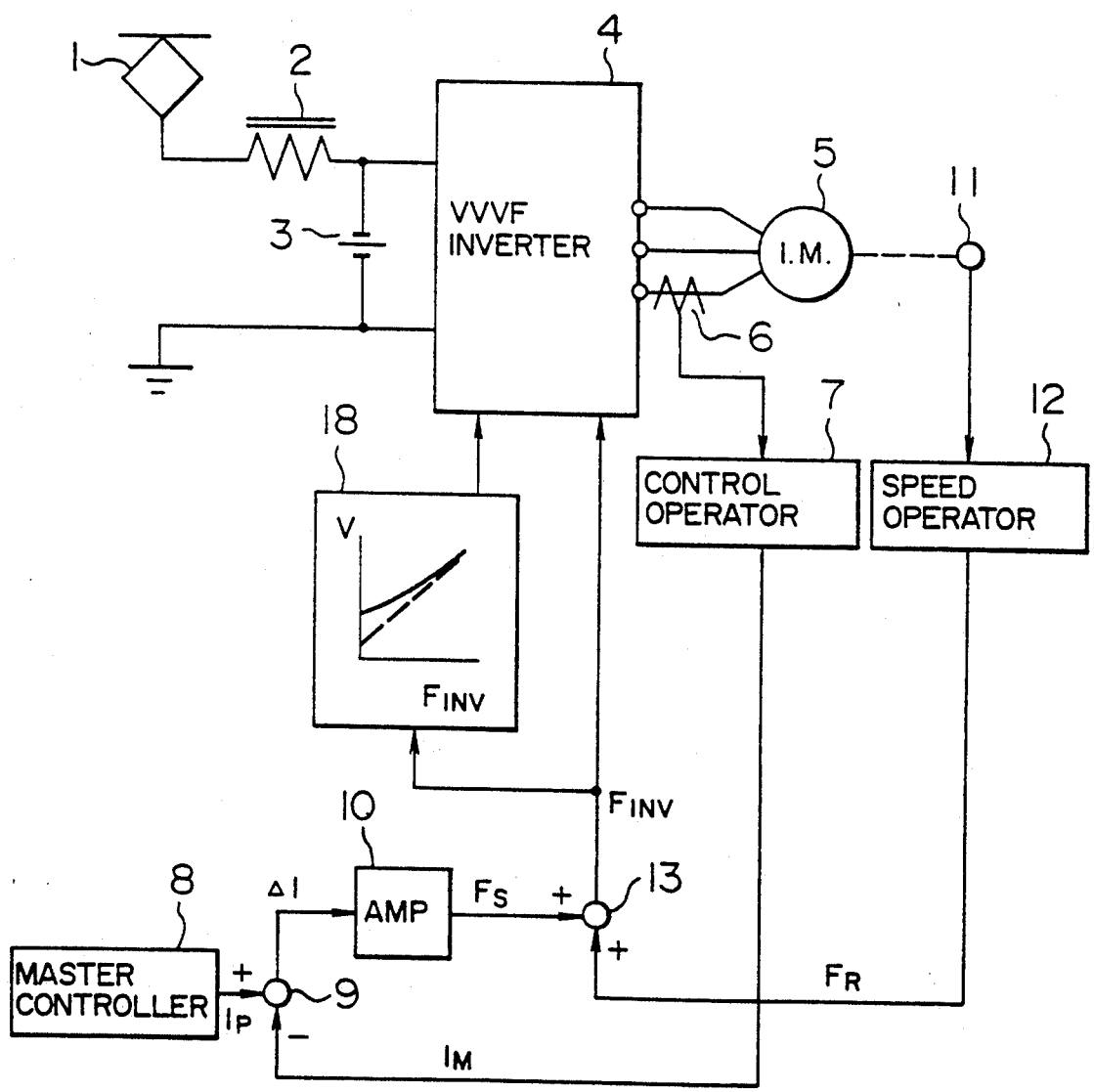

CONTROL DEVICE FOR INDUCTION MOTOR

BACKGROUND OF THE INVENTION

The present invention relates to a device for obtaining a constant torque characteristic in a control for an induction motor driven by an inverter.

FIG. 7 shows a block diagram of the conventional control device for an induction motor type electric rolling stock. A current fed from a pantograph 1 is inputted through a filter reactor 2 and a filter condensor 3 to a variable-voltage variable-frequency inverter 4 which generates a variable-voltage variable-frequency (hereinafter referred to as VVVF) alternating current. A three-phase alternating current produced by the VVVF inverter 4 is inputted to a tree-phase induction motor 5 to drive it. A current detected by a current detector 6 is inputted to a current operator (or computing element) 7 in which a motor current $I_M$ is calculated.

A comparator 9 compares the motor current $I_M$ with a motor current command $I_P$ produced by a master controller 8 and a deviation $\Delta I$ of $I_M$ from $I_P$ is inputted to an amplifier 10 which is turn outputs a slip frequency $F_S$. On the other hand, the output of a speed detector 11 is inputted to a speed operator 12 to obtain a motor rotation frequency $F_R$. The slip frequency $F_S$ and the motor rotation frequency $F_R$ are added by an adder 13 to obtain an inverter frequency $F_{INV}$. (Upon power running and upon regeneration, $F_S$ and $F_R$ was subtracted from each other.) The inverter frequency $F_{INV}$ is inputted to a voltage operator 14 which in turn outputs a motor voltage V proportional to the inverter frequency $F_{INV}$. When seen from the inverter 4, the motor voltage V is an output voltage command. In actual, a modulation rate is inputted to a PWM modulating portion of the inverter 4. The inverter 4 operates PWM-modulated in accordance with the inverter frequency $F_{INV}$ and the motor voltage V.

With the above construction, since a voltage to frequcny ratio (V/F) is controlled to be constant and a current is controlled to be constant by increasing or decreasing the slip frequency $F_S$, a constant torque is obtained. This system is termed an $F_S$ control system.

The $F_S$ control system involves a problem that the torque is decreased in a low frequency region. A cause of the decrease of torque will be hereinafter mentioned in detail.

According to a report presented by the Technical & Research Report (II Part) of Institute of Electrical Engineers of Japan, No. 109, (April 1981), p. 39, the compensation for the voltage drop of a primary impedance which is a cause of the decrease of torque in a low speed region of an induction motor, is made by correcting V/F in a direction in which V/F increases more than a straight line on which V/F is constant.

In the above prior art, on the premise that the detection of the gap flux of an induction motor is difficult, a terminal voltage to frequency (V/F) line or curve is selected which will provide an approximately constant torque. Namely, since it is difficult to measure the torque of the induction motor, it is not possible to determine V/F which makes the torque ideally constant.

For example, when the above method is applied to an electric railcar, no great problem arises even if the torque is not kept strictly constant. However, for example, upon activation on an ascent gradient in the case of a line having a steep gradient, the decrease of torque gives rise to a problem in regard to the running of the electric railcar since a torque in a low speed region is required for activation.

Also, in an electric locomotive using an $F_S$ control, the decrease (or variation) of torque gives a severe influence upon activation, especially, in the case where heavily loaded freight cars are coupled to each other. Namely, in the case where the torque is small, the activation becomes impossible. In the case where proper correction causes the generation of a torque larger than a required or desired torque, a slip occurs resulting in the difficulty of activation.

SUMMARY OF THE INVENTION

An object of the present invention is to provide a control device for induction motor which is capable of providing a substantially constant torque characteristic.

To that end, in the present invention, an $F_S$ control system is provided with means for correcting a voltage proportional to an inverter frequency in accordance with the internal impedance angle of an induction motor.

The reason why a constant torque is obtained by the above correcting means will be mentioned briefly here but detail in later. If the value of the sine of the internal impedance angle of the induction motor and a torque curve are plotted on the same graph with an inverter frequency being taken as the abscissa of the graph, they change at the substantially same rate. This fact is utilized since it is not possible to directly measure the torque. Namely, a voltage is increased (or decreased) in accordance with the impedance angle (or the sine thereof), thereby making it possible to keep the torque constant.

BRIEF DESCRIPTION OF THE DRAWINGS

The above and other objects, features and advantages of the present invention will be described hereinafter with respect to the accompanying claims and drawings, which like reference numerals are used to describe similar parts throughout the several views of the invention, and wherein:

FIG. 1 is a block diagram showing an embodiment of the present invention;

FIG. 4 is a block diagram of another embodiment of the present invention;

DESCRIPTION OF THE PREFERRED EMBODIMENTS

The present invention will now be described in detail with respect to the accompanying drawings.

Prior to explanation of embodiments, the principle of the present invention will be mentioned in detail.

Figure 8:
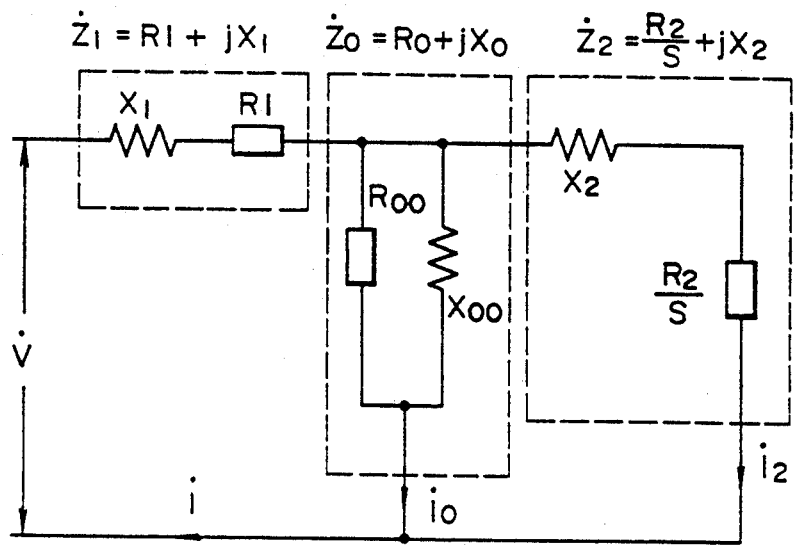
FIG. 8 shows a T equivalent circuit of an induction motor.

A T equivalent circuit of an induction motor is shown in FIG. 8. Defining symbols, V is an input phase voltage, I an input current, $X_1$ a primary reactance, $R_1$ a primary resistance, $R_{OO}$ an iron loss, $X_{OO}$ an exciting reactance, $X_2$ a secondary equivalent reactance, $R_2/S$ a secondary equivalent resistance (S: slip ratio), $I_2$ a secondary current (at a primary reduced value), and $I_0$ a composite current of an exciting circuit and an iron lose circuit.

When a primary impedance $Z_1$, a secondary impedance $Z_2$ and an impedance $Z_0$ for excitation and iron loss are represented by $$Z_1 = R_1 + jX_1 \quad (1)$$

$$Z_2 = R_2/S + jX_2 \quad (2)$$

$$Z_0 = R_0 + jX_0 \quad (3)$$

and circuit equations set up in accordance with the Kirchhoff's law are solved, the following is obtained:

$$I_0 = \frac{Z_2}{Z_0 Z_1 + Z_1 Z_2 + Z_2 Z_0} V \quad (4)$$

$$I_2 = \frac{Z_0}{Z_0 Z_1 + Z_1 Z_2 + Z_2 Z_0} V \quad (5)$$

$$I_1 = \frac{Z_0 + Z_2}{Z_0 Z_1 + Z_1 Z_2 + Z_2 Z_0} V. \quad (6)$$

Also, a secondary input $P_2$ and a torque $T_{RQ}$ are represented by the following equations:

$$P_2 = I_2^2 \frac{R_2}{S} m \, [W] \quad (7)$$

$$T_{RQ} = \frac{P_2}{\left( \frac{2\pi F_{INV}}{Pole} \right)} [N \cdot m] \quad (8)$$

where $I_2$ represents the absolute value of $I_2$, $F_{INV}$ the inverter frequency, Pole the number of pole pairs, and m the number of phases.

We will try to simulate the characteristics of an induction motor by use of the above equations. A torque $T_{RQ}$ and a current I can be known if the inverter frequency $F_{INV}$, a slip frequency $F_S$, the voltage V and the motor constants ($R_0$, $R_1$, $R_2$, $X_0$, $X_1$ and $X_2$) are known or determined.

In the case of a $V_C$ control system in which the moduration rate is controlled to make the motor current constant, the slip frequency $F_S$ is fixed. Accordingly, if the motor rotation frequency $F_R$ is determined, the inverter frequency $F_{INV}$ can be calculated and the impedance of the equivalent circuit (or the motor constants), too, can be determined. As a result, a voltage at the time of a constant current is simply determined. Thus, the simulation can be carried out simply.

Figure 7:
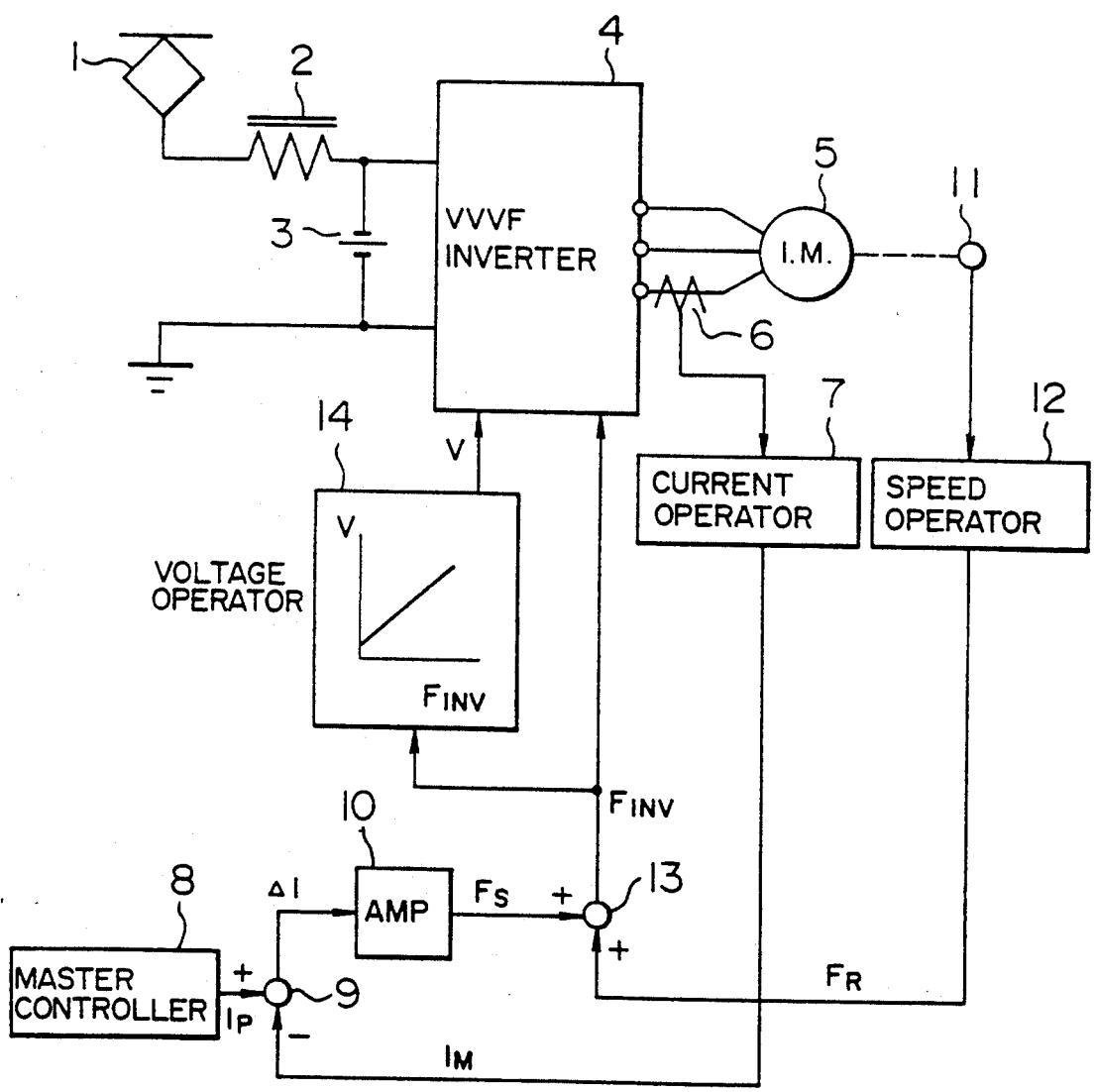
FIG. 7 is a block diagram of the conventional $F_S$ control system.

However, in the case of the $F_S$ control system mentioned in conjunction with FIG. 7, the simulation cannot be carried out, unlike the case of the $V_C$ control system, since the slip frequency $F_S$ varies in accordance with a current deviation. The reason is because the current I turns into a function of the slip frequency $F_S$ and the voltage E, as apparent from equations (4) to (6). Even if the current I is reduced to a function of only the slip frequency $F_S$ by introducing the condition that the voltage V is proportional to the inverter frequency $F_{INV}$, there results in a higher-order equation and it is difficult to solve this equation.

In this case, since it is desired to compute or determine the characteristics when the motor rotation frequency $F_R$ takes a certain value, the inverter frequency $F_{INV}$ can be determined if the slip frequency $F_S$ to be determined is properly fixed. Since the inverter frequency $F_{INV}$ and the voltage V have a porportional relation, the voltage V can be calculated. Further, since the current I is constant, the slip frequency $F_S$ can be determined by using the following asymptotic method:

① A possible slip frequency range from the maximum value to the minimum value is equally divided into, for example, five parts and currents I for the respective parts are calculated.

② Since the current I is a constant value, a region between two values of the result of calculation extending over the constant current value is equally divided into five parts and the current I is calculated on the basis of the slip frequency.

Figure 9:
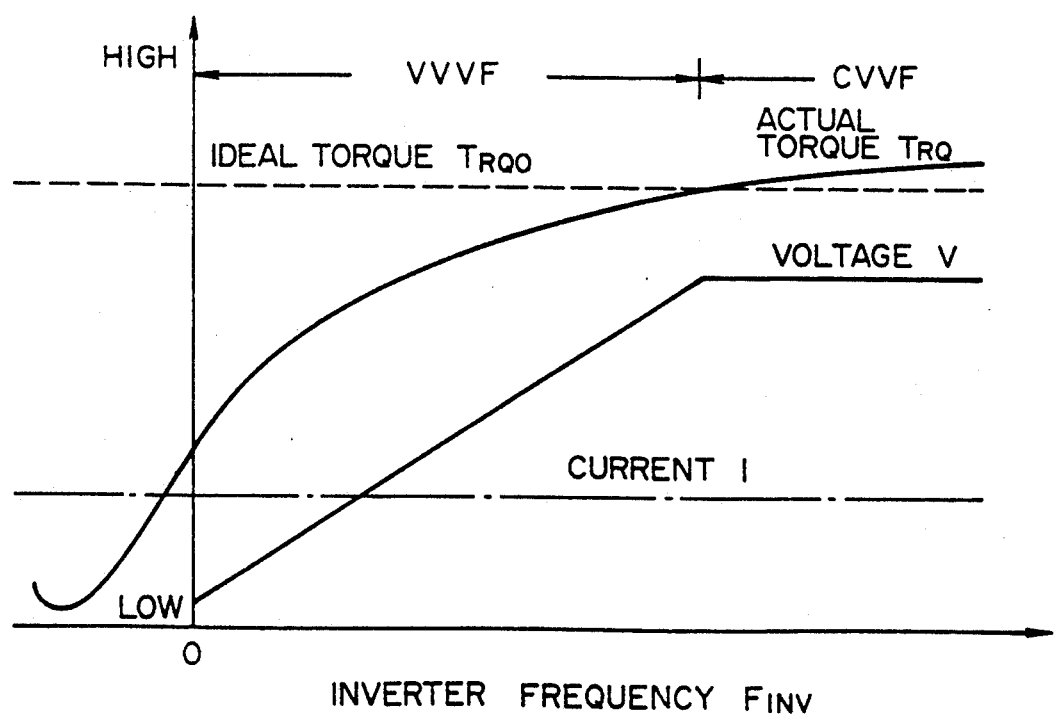
FIG. 9 is a graph showing the frequency characteristic of a torque in an $F_S$ control system.

③ The operation of ② is continued until an error which the value of current I obtained in ② has relative to the constant value becomes equal to or below the order of $10^{-6}$. The slip frequency $F_S$ at that moment is obtained through the above routine. The result of simulation upon $F_S$ control using this technique is shown in FIG. 9. From the result shown in FIG. 9, it is seen that the actual torque $T_{RQ}$ decreases apart from an idel torque $T_{RDQ}$ notwithstanding that the current I and the voltage to frequency ratio V/F are controlled to be constant. If this situation is left intact, it is difficult to attain a constant torque control through the feedback of the current.

This decrease of torque is caused by a great change of the separation ratio of current $I_0$ and current $I_2$ between a high speed region and a low speed region (see the equivalent circuit shown in FIG. 8). The present inventors have investigated the frequency characteristic of an internal impedance which is a cause for the change of the separation ratio. In this connection, the impedance angle $\phi$ can be calculated from equation (6). By use of this impedance angle $\phi$, sin $\phi$ and cos $\phi$ (or power factor) as well as a torque curve have been depicted on the same graph (see FIG. 10). From FIG. 10, it has been revealed that the decrease of torque in a low speed region and the sin $\phi$ curve bear a resemblance to each other. The present inventors have hit on the notion of obtaining a constant torque characteristic by use of the above fact.

In order to obtain a constant torque characteristic, it is most preferable to calculate a torque and make a feedback. But, the torque calculated from equations (7) and (8) is as follows:

$$T_{RQ} = \frac{I_2^2 R_2 m}{\left(\frac{2\pi F_{INV}}{Pole}\right) S} \quad (9)$$

Namely, since the secondary current $I_2$ cannot be measured, it is not possible to calculate the torque.

However, the impedance angle $\phi$ can be calculated if the motor rotation frequency $T_R$ and the slip frequency $F_S$ are known. Equations for calculation of the impedance angle $\phi$ are as follows:

$$F_{INV} = F_R + R_S \quad (10)$$

$$\omega = 2\pi F_{INV} \quad (11)$$

$$X_{00} = \omega L_{00}, \ X_1 = \omega L_1, \ X_2 = \omega L_2 \quad (12)$$

$$S = \frac{F_S}{F_{INV}} \quad (13)$$

$$Z_2 = \frac{R_2}{S} + j\omega L_2 = \frac{F_{INV}}{F_S} R_2 + j\omega L_2 \quad (14)$$

and from equations (1), (2), (3) and (14)

$$Z = \frac{Z_0 Z_1 + Z_1 Z_2 + Z_2 Z_0}{Z_0 + Z_2} = R + jX \quad (15)$$

$$\therefore \phi = \arctan\left(\frac{X}{R}\right). \quad (16)$$

Since sin $\phi$ thus determined resembles to the torque curve, the value of sin $\phi$ can be regarded as being a torque. If a motor voltage is increased in accordance with the rate of decrease of sin $$\phi(= \sqrt{1 - (\text{power factors})^2})$$

from a rated value sin $\phi_0$, it is possible to correspondingly increase the torque so that a constant torque characteristic is obtained.

Now, a method of setting the motor voltage will be mentioned.

Provided that $V_0$ and $F_0$ are a rated voltage and a rated frequency in the case where the internal constants of a motor are settled, a reference value of V/F is $V_0/F_0$. In this case, $V_0$ and $F_0$ are the voltage and the frequency at a point of transition from a variable-voltage variable-frequency region (or VVVF region) of an inverter to a constant-voltage variable-frequency region (or CVVF region) thereof. Provided that an impedance angle at this time is $\phi_0$, a motor voltage V at any inverter frequency $F_{INV}$ in a low speed region is set as follows:

$$V = \frac{F_{INV}}{F_0} \times \frac{\sin \phi_0}{\sin \phi} \times V_0. \quad (17)$$

Figure 10:
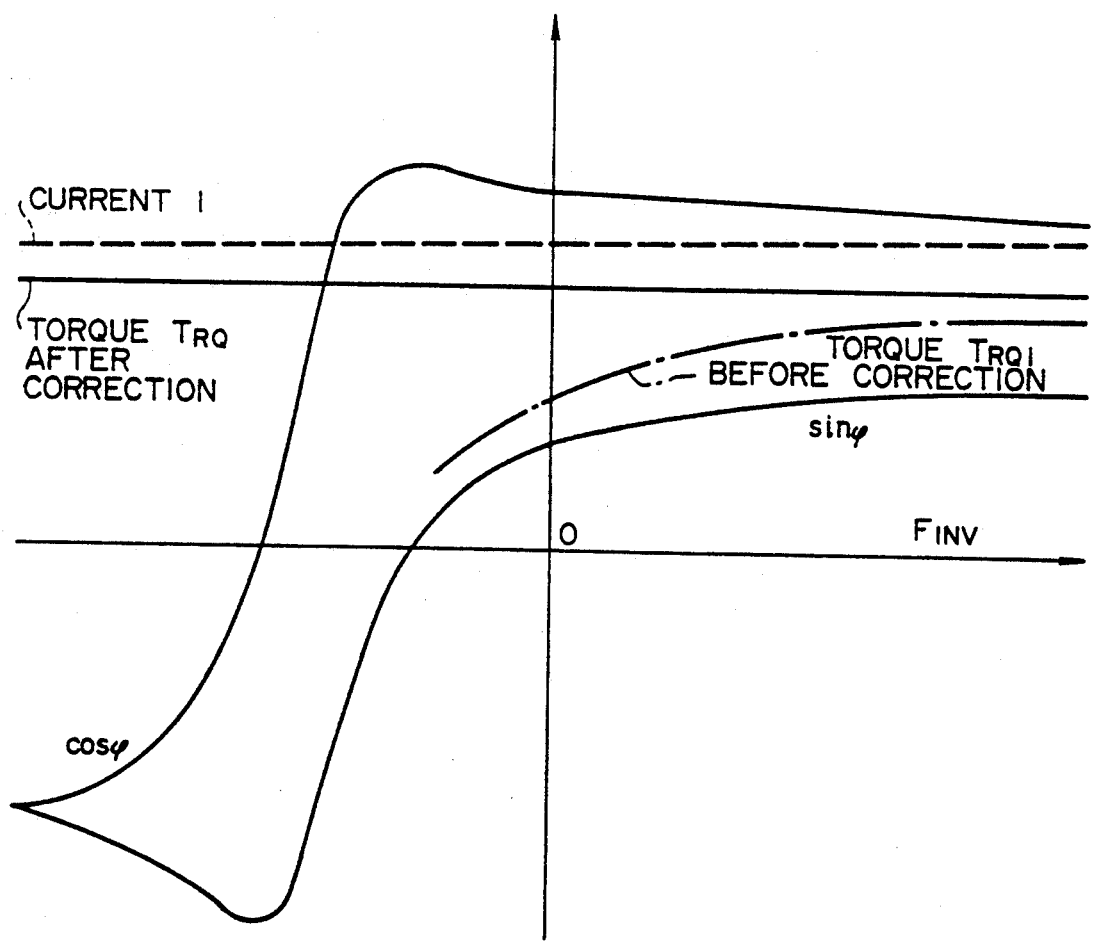
FIG. 10 is a graph showing the frequency characteristics of a power factor and the sine of an impedance angle.

Namely, a constant torque characteristic is obtained by multiplying the conventionally used V/F value by a correction factor of $$\frac{\sin \phi_0}{\sin \phi}$$

under the condition that the current is constant. The result of simulation for a torque $T_{RQ}$ after correction is shown in FIG. 10. From the figure, it is seen that if the current I is constant, the torque is substantially constant.

An embodiment of the present invention will now be explained by virtue of FIG. 1.

The repetition of the foregoing explanation made in conjunction with FIG. 7 will be omitted herein and differences from FIG. 7 will be mentioned in detail. Components newly added to the construction shown in FIG. 7 are a correction factor operating circuit 14, a reference V/F generator 15, and multipliers 16 and 17.

The correction factor operating circuit 14 is inputted with a motor rotation frequency $F_R$ and a slip frequency $F_S$ to calculate a correction factor $K_1$ for a V/F value at an inverter frequency $F_{INV}$ at which an inverter 4 is operated. If $F_{INV} < F_0$, the circuit 14 outputs $K_1$ which is larger than 1. When $F_{INV} > F_0$, the torque becomes slightly larger than a reference torque but an error is negligible since it is small. In the case where the error should not be neglected, the circuit 14 may output $K_1$ smaller than 1 when $F_{INV} > F_0$.

In the multiplier 16, an output of the reference V/F generator 15 preliminarily supplied considering various conditions including the characteristics of an induction motor 5 and the properties of an electric rolling stock is multiplied by the correction factor $K_1$. Thereby, a V/F value (=$K_2$) at the inverter frequency $F_{INV}$ at this point of time is determined. The multiplier 17 multiplies the inverter frequency $F_{INV}$ by $K_2$ to output a voltage V (or modualtion rate $\gamma$) for obtaining a constant torque.

Figure 2:
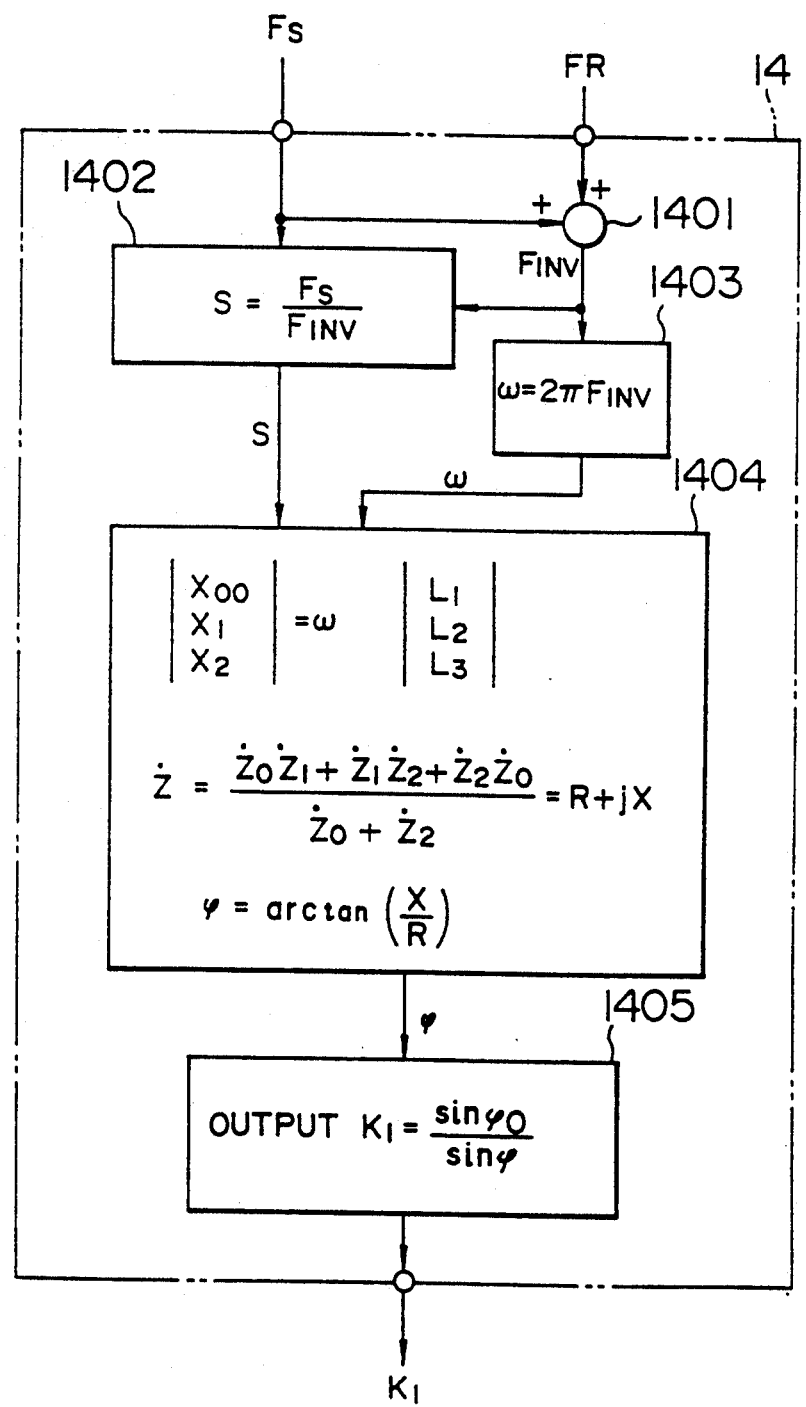
FIG. 2 is a block diagram showing one example of a correction factor operating circuit according to the present invention.

One example of the correction factor operating circuit 14 is shown in FIG. 2.

The motor rotation frequency $F_R$ and the slip frequency $F_S$ are added by an adder 1401 to obtain an inverter frequency $F_{INV}$. The inverter frequency $F_{INV}$ is inputted to an operator 1403 which in turn outputs an electrical angular velocity $\omega$. The slip frequency $F_S$ and the inverter frequency $F_{INV}$ are inputted to a slip ratio operator 1402 which in turn outputs a slip ratio S. The slip ratio S is used for calculating a secondary impedance $Z_2$ (see equation (2)). The slip ratio S and the electrical angular velocity $\omega$ are inputted to an impedance angle operator 1404 which in turn performs an operation according to equations (10) to (16) to output an impedance angle $\phi$. A correction factor operator 1405 makes the ratio of sin $\phi_0$ at a rated point to sin $\phi$ to output a correction factor $K_1$.

Referring to the equivalent circuit shown in FIG. 8, the impedance angle $\phi$ may be determined from a relation between the voltage V and the current I. In a high speed region, a relatively accurate value can be calculated since the frequency is high. In a low speed region, however, a considerable time is required until a phase difference is detected or determined. Also, since the voltage V and the current I are measured after the inverter 4 has been controlled, a timing for control is delayed, thereby causing a variation of torque. Accordingly, in the present invention, the impedance angle φ is not determined or calculated from the above relation.

Next, another example of the correction factor operating circuit 14 will be explained by virtue of FIG. 3.

The slip frequency $F_S$ and the motor rotation frequency $F_R$ are inputted to an adder 1410 and added therein to obtain an inverter frequency $F_{INV}$ which is in turn inputted to a pattern operator 1411. A correction factor $K_1$ calculated by use of the motor constants has preliminarily been stored as a function of the inverter frequency $F_{INV}$ in the pattern operator 1411. In the example shown in FIG. 3, the correction factor $K_1$ in a CVVF region is smaller than 1. However, it may be equal to 1. The pattern operator 1411 outputs the correction factor $K_1$ in accordance with the inverter frequency $F_{INV}$ inputted from the adder 1410. A processing speed in the example shown in FIG. 3 is remarkably fast as compared with that in the example shown in FIG. 2.

FIG. 4 shows another embodiment of the present invention. The present embodiment is different from the embodiment shown in FIG. 1 in that a V/F pattern operator 18 is provided in place of the correction factor operating circuit 14, the reference V/F generator 15 and the multipliers 16 and 17.

The details of the V/F pattern operator 18 will be explained by virtue of FIG. 5.

As mentioned before, the correction factor is determined if the motor constants are settled. In the shown example, the inverter frequency $F_{INV}$ is inputted and a motor voltage V corresponding to the inverter frequency is outputted. (The motor voltage V is shown for simplicity and a modulation rate γ is actually outputted.) A value of a preliminarily calculated value multiplied by a reference V/F value is stored in the V/F pattern operator 18.

In the correction factor operating circuit 14 shown in FIG. 2, the slip frequency $F_S$ is inputted to determine the slip ratio S which is to be used to determine the secondary impedance $Z_2$. Namely, the slip frequency $F_S$ is inputted for determining the secondary impedance $Z_2$. However, in the pattern operator 1411 of the correction factor operating circuit 14 shown in FIG. 3 or the V/F pattern operator 18 shown in FIG. 5, the slip frequency $F_S$ is not inputted. Therein, the correction factor $K_1$ or the motor voltage V as a function of the inverter frequency $F_{INV}$ is only obtained. Referring to FIG. 1, the slip frequency $F_S$ changes in accordance with the current deviation ΔI with the result that the secondary impedance $Z_2$ changes correspondingly. Therefore, it is primarily necessary to accurately determine the slip frequency $F_S$.

In the following, explanation will be made of the reason why a constant torque can be obtained even by a simplified pattern.

Figure 3:
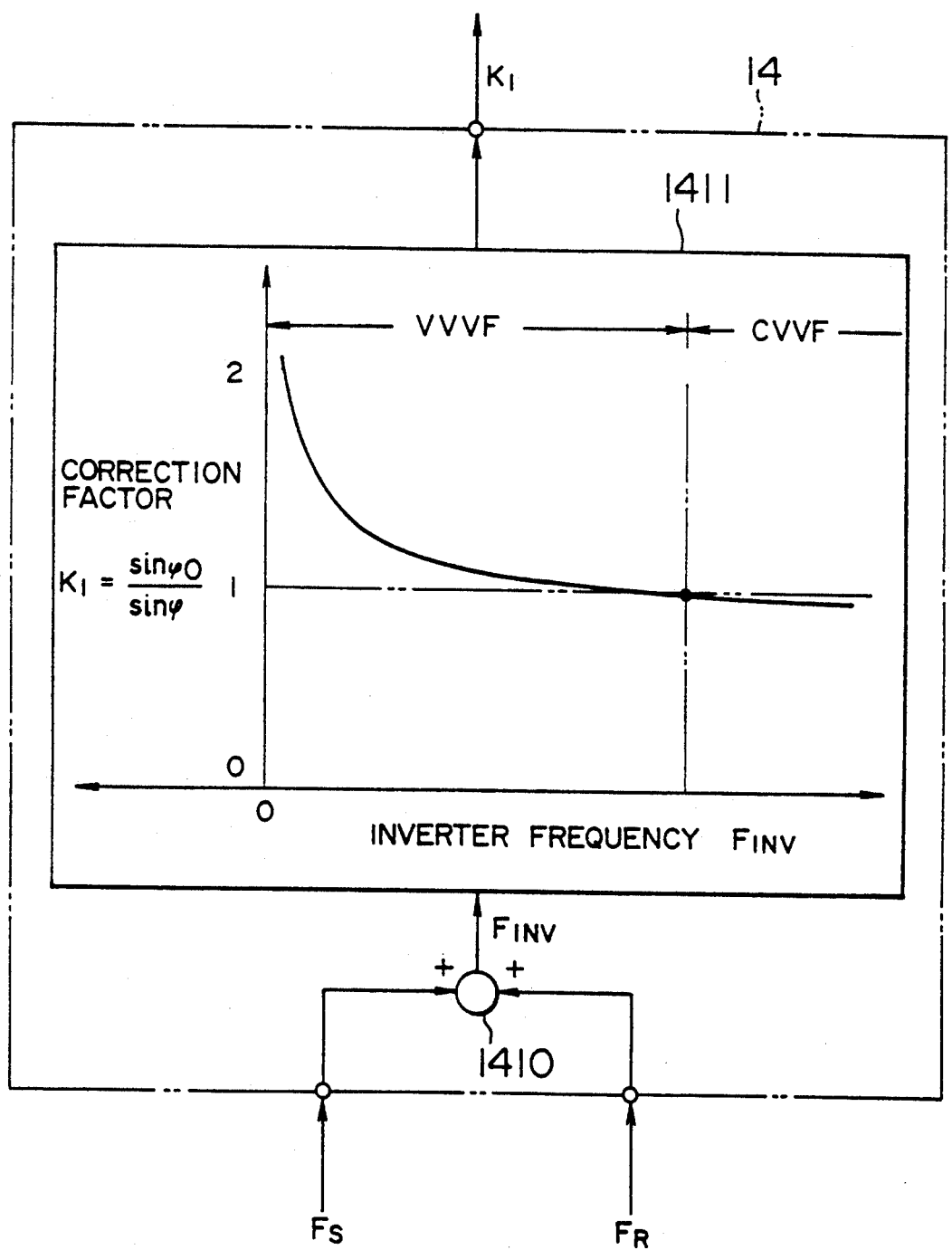
FIG. 3 is a diagram showing another example of a correction factor operating circuit according to the present invention.
Figure 5:
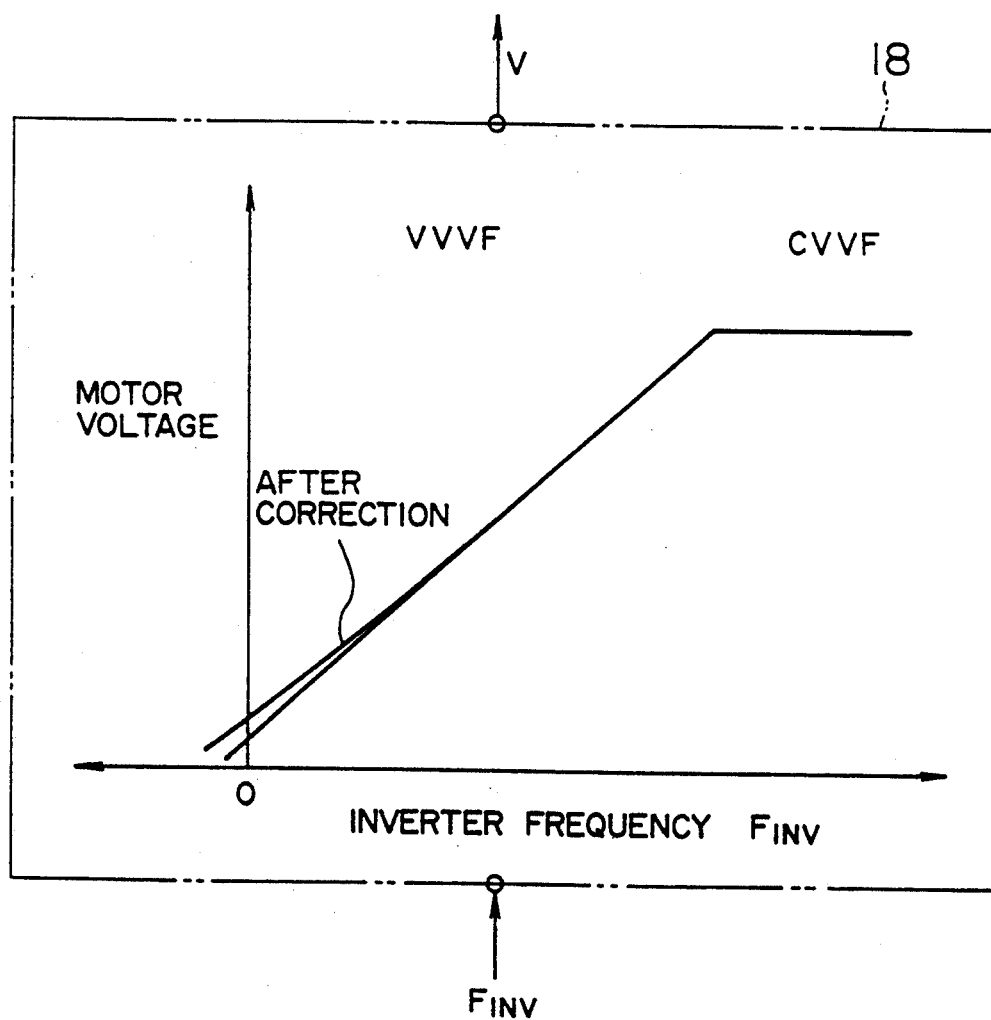
FIG. 5 is a diagram showing a V/F pattern operator according to the present invention.

The correction factors in FIGS. 3 and 5 are determined as follows. In substance, it is desirable that the slip frequency $F_S$ is fixed. Accordingly, a correction factor $K_1$ is determined for each motor rotation frequency $F_R$ with the slip frequency $F_S$ being fixed. This can be graphically represented as a graph shown in the pattern operator 1411 of FIG. 3 in which the inverter frequency $F_{INV}$ and the correction factor $K_1$ are taken as the abscissa and the ordinate, respectively. A graph obtained by multiplying a voltage V at each inverter frequency $F_{INV}$ by the thus determined correction factor $K_1$ is shown in the V/F pattern operator 18 of FIG. 5.

Figure 6:
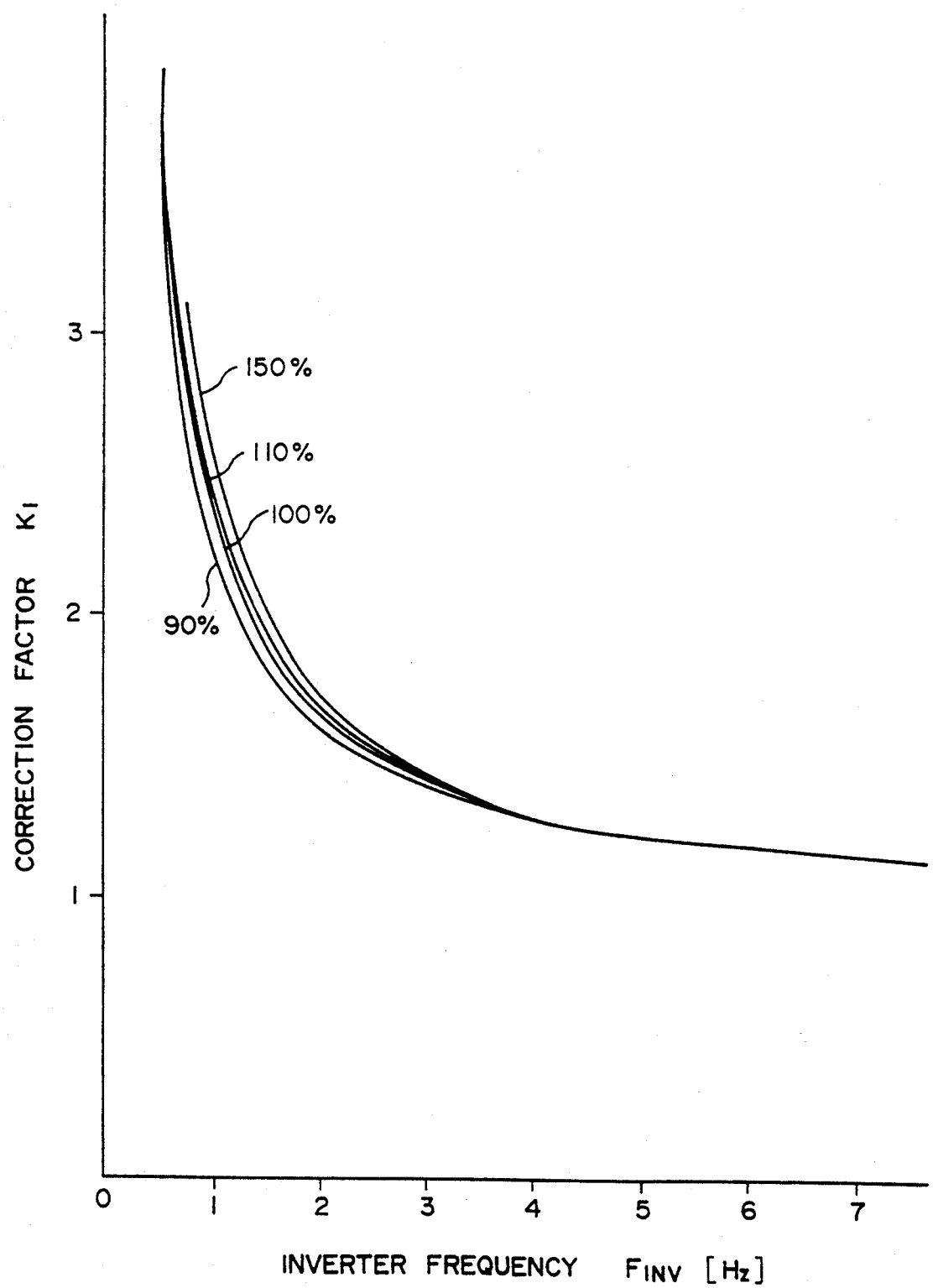
FIG. 6 is a graph showing an $F_{INV}$-$K_1$ characteristic with a slip frequency being taken as a parameter.

Next, it will be proved that even if the slip frequency $F_S$ is fixed, the influence is small. FIG. 6 shows graphically a relation between the inverter frequency $F_{INV}$ and the correction factor $K_1$ with the slip frequency $F_S$ being taken as a parameter. From the figure, it can be understood that when the slip frequency $F_S$ is changed from its rated value (100%) to 110%, 150% and 90%, an error of the correction factor from its value at the rated slip frequency falls within a tolerance. Also, in a region where the inverter frequency is lower than 2 to 4 Hz, there is almost no influence since a $V_C$ control is made, as will be mentioned in later. Accordingly, even if the correction factor $K_1$ is calculated with the slip frequency $F_S$ being fixed, almost no error is produced.

The foregoing explanation has been made in conjunction with the case where the constant torque control based on the $F_S$ control is made over the entire speed area. This $F_S$ control is not almighty and has a demerit. Namely, the speed detector 11 for which an encoder is practically used has a poor resolution in a ultra-low speed region (of 0 to 4 Hz). If a frequency in or near the ultra-low speed region cannot be calculated accurately, the value of the motor rotation frequency $F_R$ will involve a large error which is in turn superposed on the inverter frequency $F_{INV}$. The corresponding error of the inverter frequency $F_{INV}$ is reflected in the voltage V, thereby making the constant torque control difficult.

Figure 11:
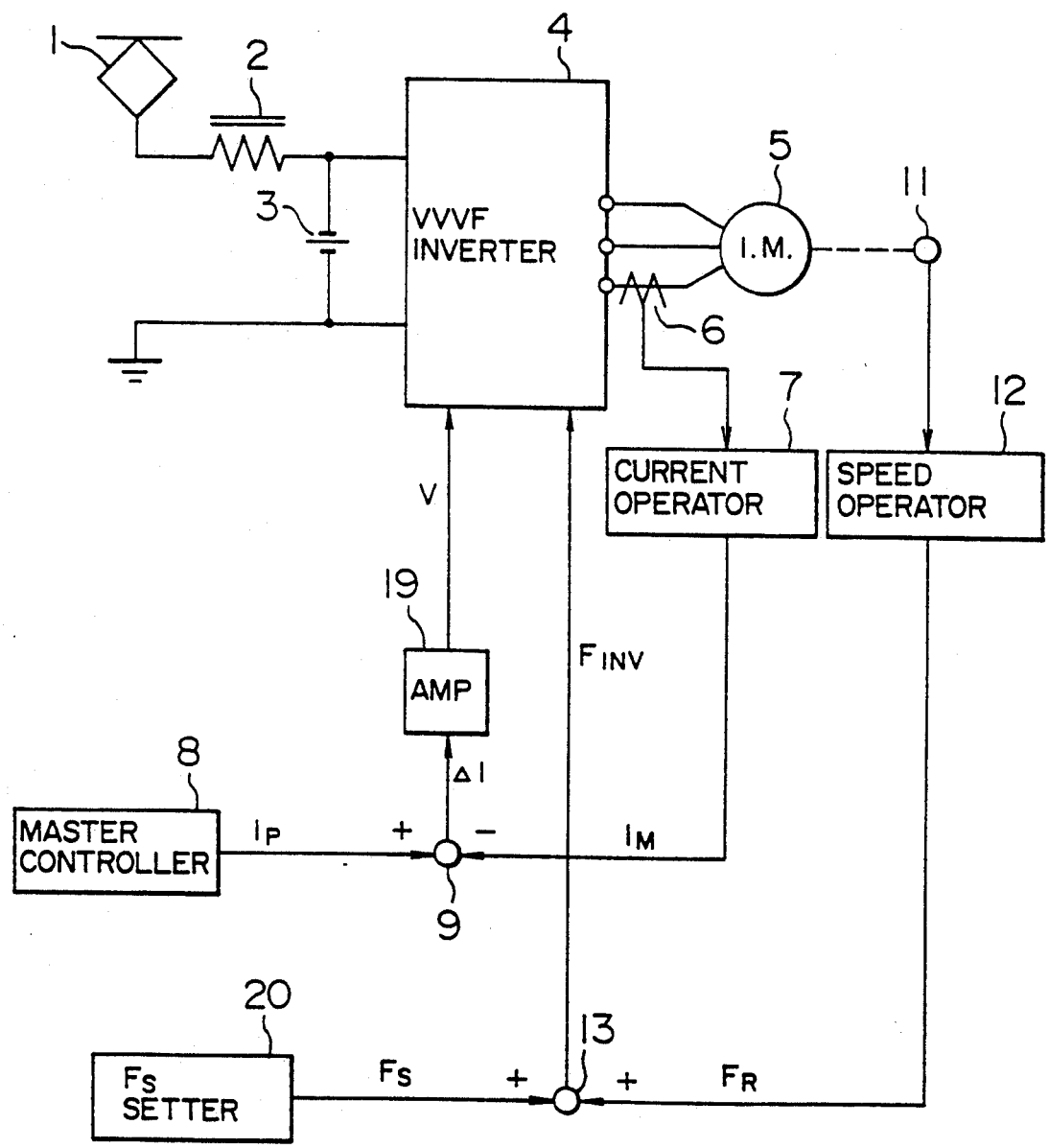
FIG. 11 is a block diagram of the conventional $V_C$ control system.
Figure 12:
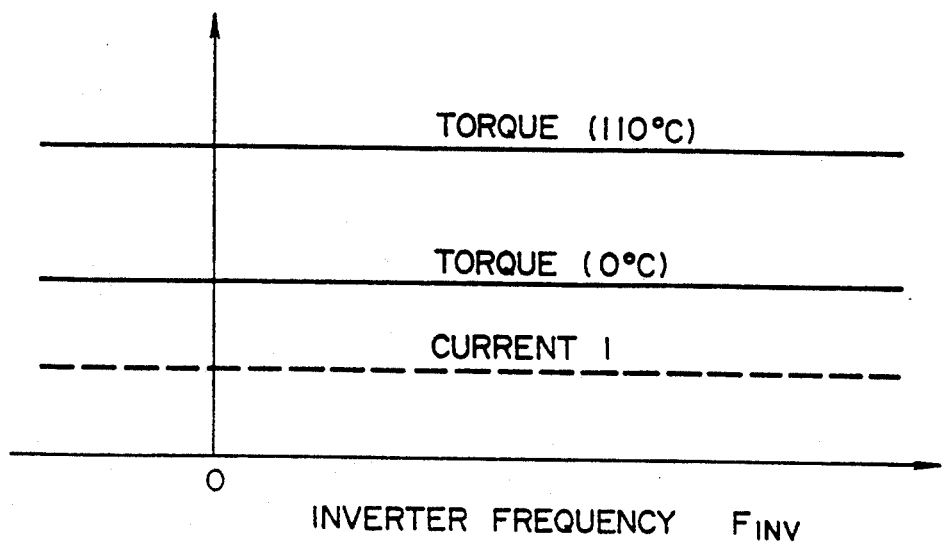
FIG. 12 is a graph showing the temperature characteristic of a torque in a $V_C$ control system.

For such circumstances, there is employed a method in which a $V_C$ control to make a current constant by changing the modulation rate of the inverter to increase or decrease a voltage while fixing the slip frequency $F_S$ is used in a low speed region. FIG. 11 shows a block diagram of a $V_C$ control system. Briefly explaining, a motor current command $I_P$ outputted from a master controller 8 and a motor current $I_M$ outputted from a current operator 7 are compared by a comparator 9 to produce a deviation ΔI of $I_M$ from $I_P$ and an inverter voltage V is increased or decreased in accordance with the deviation ΔI. This method has a merit that a torque is controlled to be substantially constant if a constant current control is made but a demerit that when the secondary resistance $R_2$ of a motor changes depending upon the motor temperature, the increasing or decreasing change of $R_2$ causes a change of torque notwithstanding that the current is controlled to be constant. This situation is shown in FIG. 12.

Figure 13:
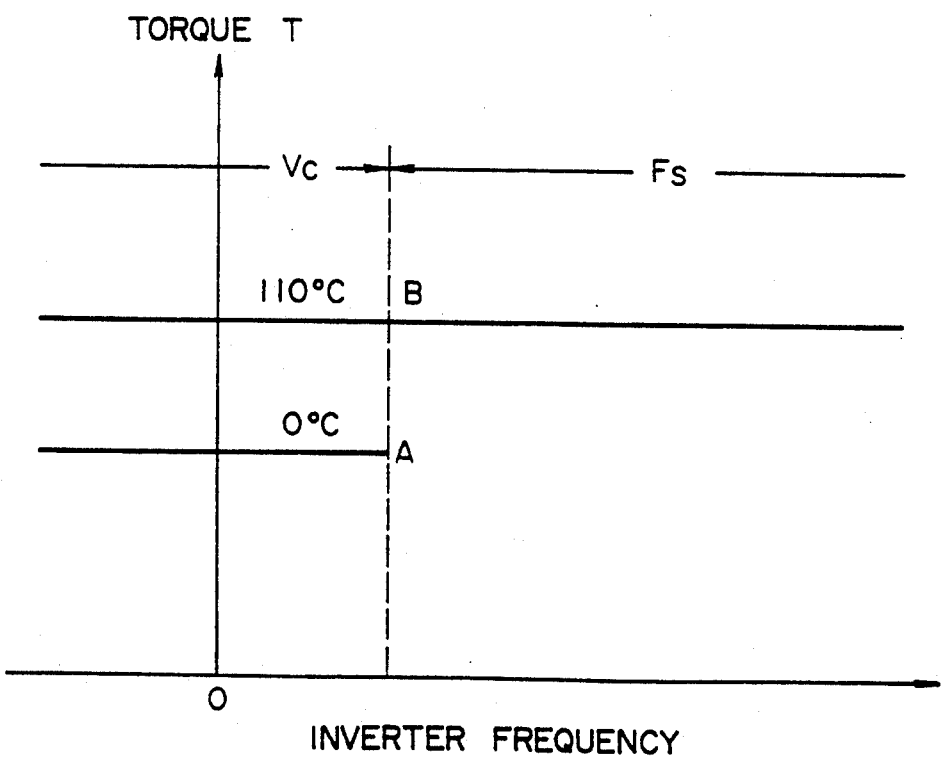
FIG. 13 is a graph showing a variation of torque upon change-over between control systems.

A matter to be considered in the case where the $V_C$ control and the $F_S$ control are used in combination, will now be explained by virtue of FIG. 13.

It is here assumed that the $F_S$ control is made using the control system shown in FIG. 1 to realize a constant torque control and the $V_C$ control is made using the control system shown in FIG. 11. Provided that there is no variation of torque upon change-over between the $V_C$ control and the $F_S$ control when the temperature of a rotor of the induction motor is 110° C., a torque when the temperature of the rotor is 0° C. is decreased as shown in FIG. 13. Namely, when a changeover between the control systems is made upon power running, the torque has a large variation from a point A to a point B.

Figure 14:
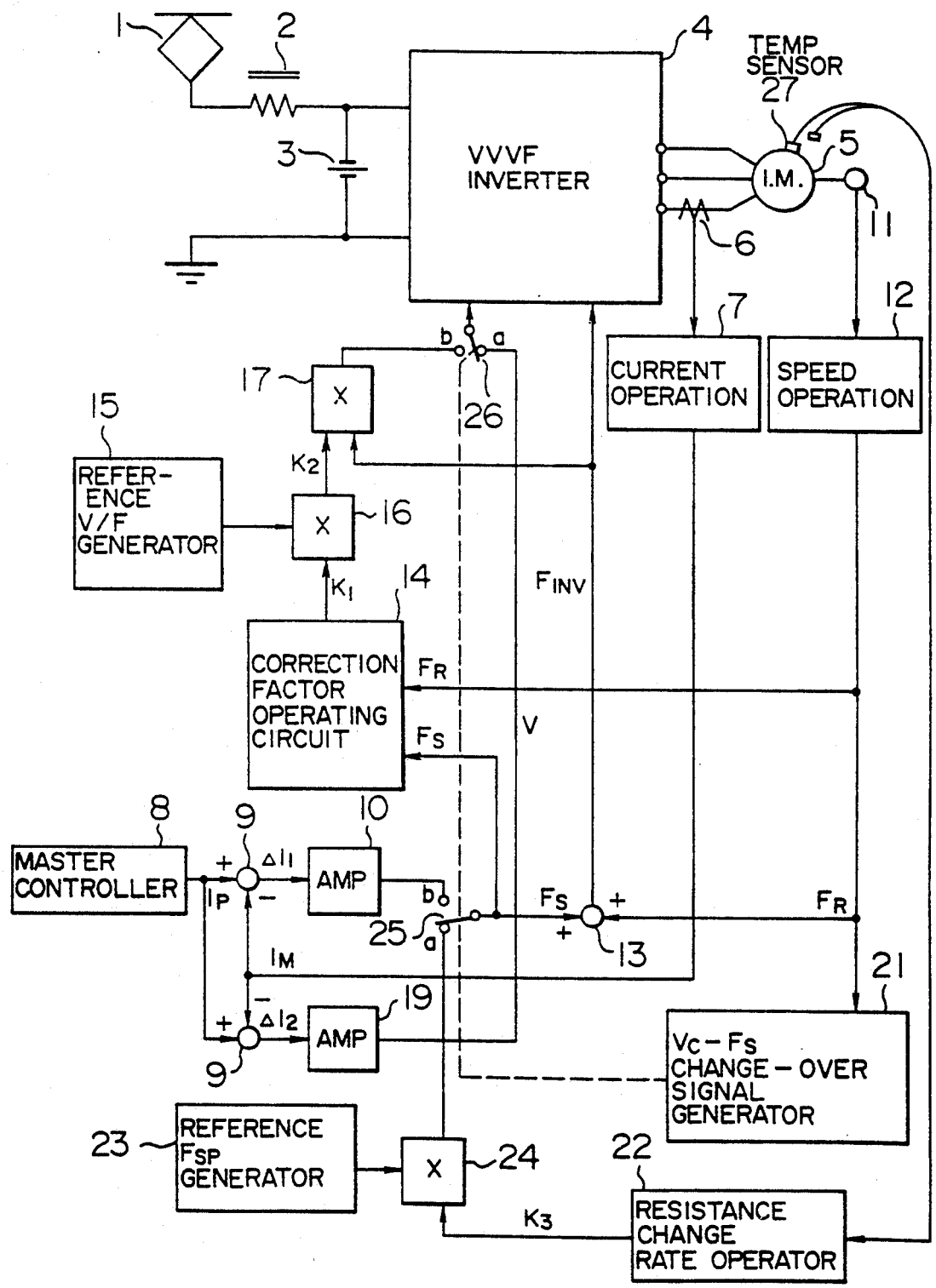
FIG. 14 is a block diagram of a further embodiment of the present invention which involves a change-over between control systems.

FIG. 14 shows a block diagram in the case where an $F_S$ control is combined with the prior art (disclosed by JP-A-57-13989) in which in order to suppress the variation of torque upon $V_C$ control, a thermistor is attached to a stator of an induction motor so that a corrected value is determined in accordance with the temperature of the stator, thereby correcting the slip frequency. In FIG. 14, the same reference numerals as those used in FIGS. 1 and 11 designate the same components or parts as those shown in FIGS. 1 and 11. A portion of the construction of FIG. 14 different from that of FIG. 1 or 11 will be explained.

Upon $V_C$ control (or at a low speed), the outputs of temperature sensors 27 provided to and in the vicinity of a stator of the induction motor 5 are inputted to a resistance change rate operator 22. In the resistance change rate operator 22, the ratio of the present temperature T to a reference temperature $T_0$ is calculated to output a correction factor $K_3$. A reference $F_{SP}$ generator 23 generates a slip frequency $F_{SP}$ at the reference temperature $T_0$ (or a temperature at which no variation in torque is caused upon change to an $F_S$ control, for example, $T_0$=about 110° C). A multiplier 24 multiplies the output $F_{SP}$ of the reference $F_{SP}$ generator 23 by the correction factor $K_3$ or the output from the resistance change rate operator 22 to output the result as a slip frequency $F_S$. At this time, since each of $V_C$-$F_S$ change-over switches 25 and 26 is placed at a side a (or $V_C$ control side), the slip frequency $F_S$ and a motor rotation frequency $F_R$ are added by an adder 13 to provide an inverter frequency $F_{INV}$.

When a $V_C$-$F_S$ change-over signal generator 21 confirms the rise of the r.p.m. or rotation frequency $F_R$ of the induction motor 5 up to a predetermined value (2 Hz to 4 Hz) as the result of gradual rise of the speed of the electric rolling stock, the $V_C$-$F_S$ change-over signal generator 21 outputs a signal which causes the $V_C$-$F_S$ change-over switches 25 and 26 to operate. Each of the $V_C$-$F_S$ change-over switches 25 and 26 is turned to a side b (or $F_S$ control side) so that the system goes into the above-mentioned $F_S$ control.

The V/F pattern operator 18 explained in conjunction with FIG. 5 may be used in place of the correction factor operating circuit 14, the reference V/F generator 15 and the multipliers 16 and 17.

According to the present embodiment, a substantially constant torque can be obtained over a period from the time of activation or start to a high-speed running inclusive of the time of change-over.

Next, other embodiments of the present invention will be explained.

Figure 17:
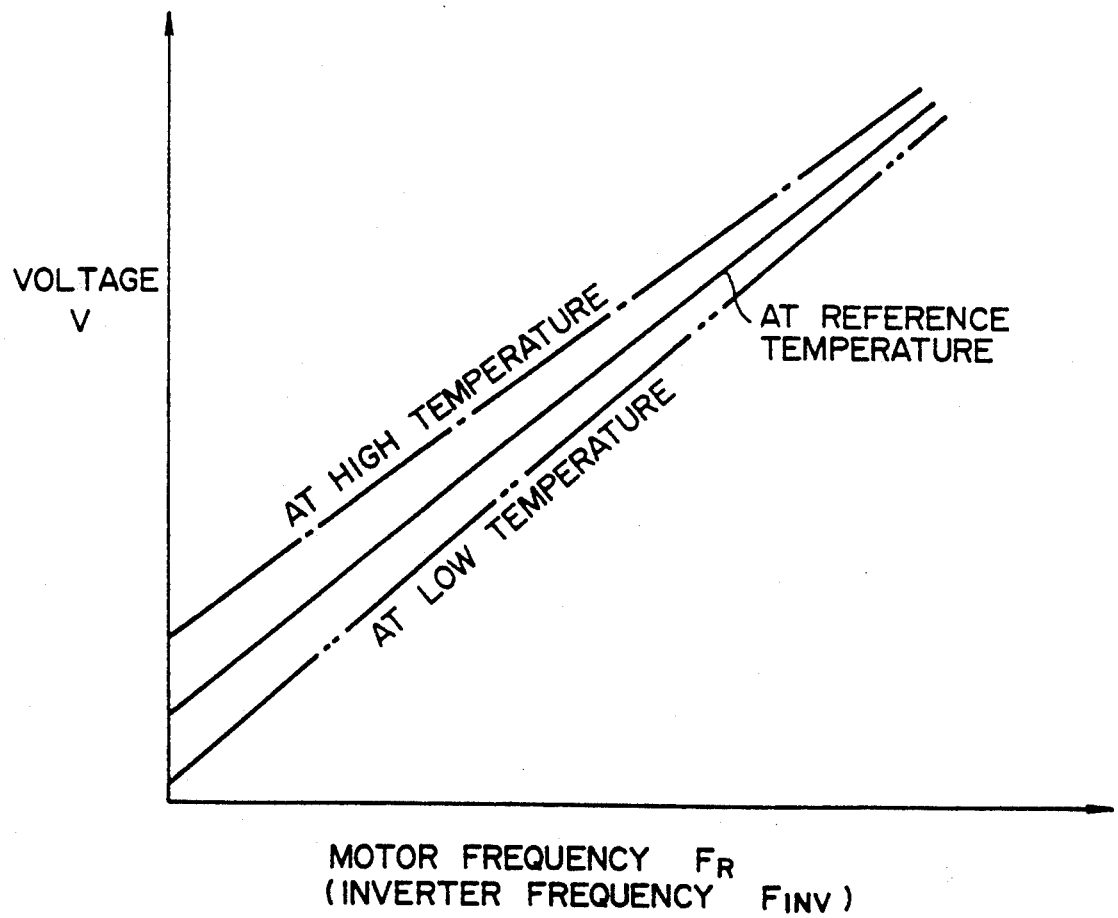
FIG. 17 is a graph showing the temperature-dependent change of a voltage.

Now assume that a straight line shown in FIG. 17 shows a frequency-voltage characteristic in the case where a torque and a current are constant when the temperature of the rotor of an induction motor is a reference temperature $T_0$ (for example, 110° C.). A two-dotted chain line and a one-dotted chain line shown in FIG. 17 respectively show the frequency-voltage characteristics at low and high temperatures in the case where only the temperature is changed under the same condition as the condition used at the reference temperature $T_0$. As apparent from the figure, the ratio of a voltage V at any temperature to a voltage $V_0$ at the reference temperature $T_0$ is substantially constant. According to the present inventors' calculation, this ratio is substantially equal to the ratio of the secondary resistance of the induction motor at any temperature to the secondary resistance thereof at the reference temperature $T_0$.

If the above is utilized, it is possible to keep the torque constant upon change from the $V_C$ control to the $F_S$ control.

Figure 15:
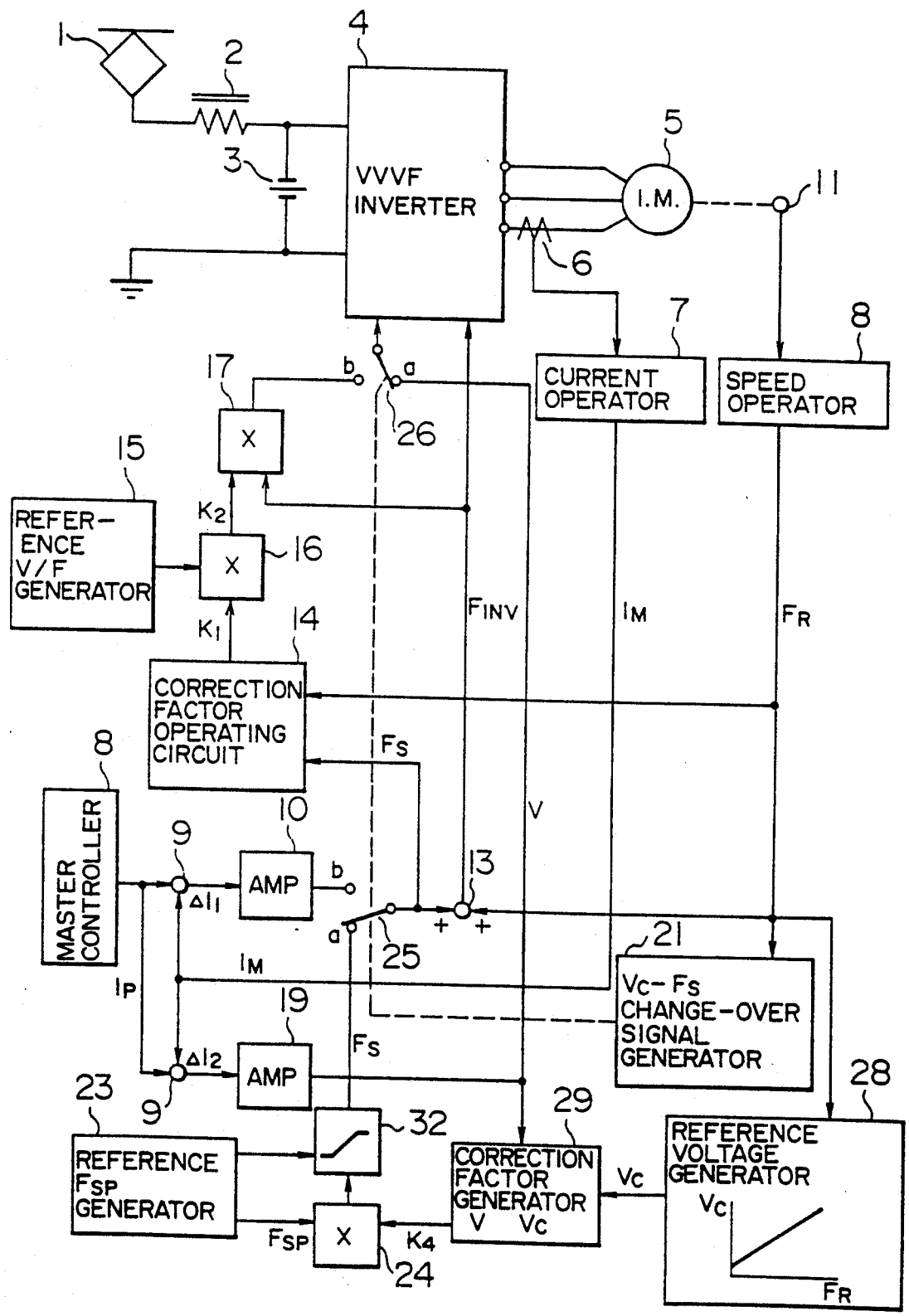
FIG. 15 is a block daigram of a still further embodiment of the present invention which involves a change-over between control systems.

An embodiment will be explained by virtue of FIG. 15. The repetition of the explanation made conjunction with FIG. 14 will be omitted herein. In FIG. 15, the same reference numerals as those used in FIG. 14 designate the same components or parts as those shown in FIG. 14.

Upon activation or start, each of change-over switches 25 and 26 is placed at a side a to select a $V_C$ control system. A motor rotation frequency $F_R$ is inputted to a reference voltage generator 28 which in turn generates a reference voltage $V_C$ corresponding to the motor rotation frequency $F_R$. The reference voltage $V_C$ outputted from the reference voltage generator 28 and a voltage V (or modulation rate $\gamma$) outputted from an amplifier 19 are inputted to a correction factor generator 29 which in turn calculates $K_4 = V/V_C$. The value of this correction factor $K_4$ is smaller than 1 in the case where the present temperature T of the secondary side of an induction motor 5 is lower than a reference temperature $T_0$ or in the case where the voltage V is smaller than the reference voltage $V_C$. In case where the present temperature T is higher than the reference temperature $T_0$, $K_4$ is larger than 1.

The output of a reference $F_{SP}$ generator 23 providing a reference slip frequency $F_{SP}$ for obtaining a torque to be outputted at the reference temperature $T_0$ is multiplied by the correction factor $K_4$ in a multiplier 24 to obtain a corrected slip frequency $F_S$.

For example, in the case where the present temperature T is lower than the reference temperature $T_0$, the torque is small. Accordingly, unless the torque is made large, a sudden change of torque occurs upon change-over between control systems. Therefore, correction is made. A correction factor $K_4$ at this time is $K_4 = V/V_C < 1$. A corrected slip frequency $F_S$ has a value smaller than the reference slip frequency $F_{SP}$. Thus, the current I, too, becomes small. Since the control system is controlled so that the current I becomes equal to the current command $I_P$, the current deviation $\Delta I$ increases and the voltage V rises in accordance with the current deviation $\Delta I$.

If the slip frequency $F_S$ for making the correction for the decrease of torque attendant upon a temperature deviation is suddenly changed, a torque shock similar to that upon change-over between control system will be generated.

Figure 18:
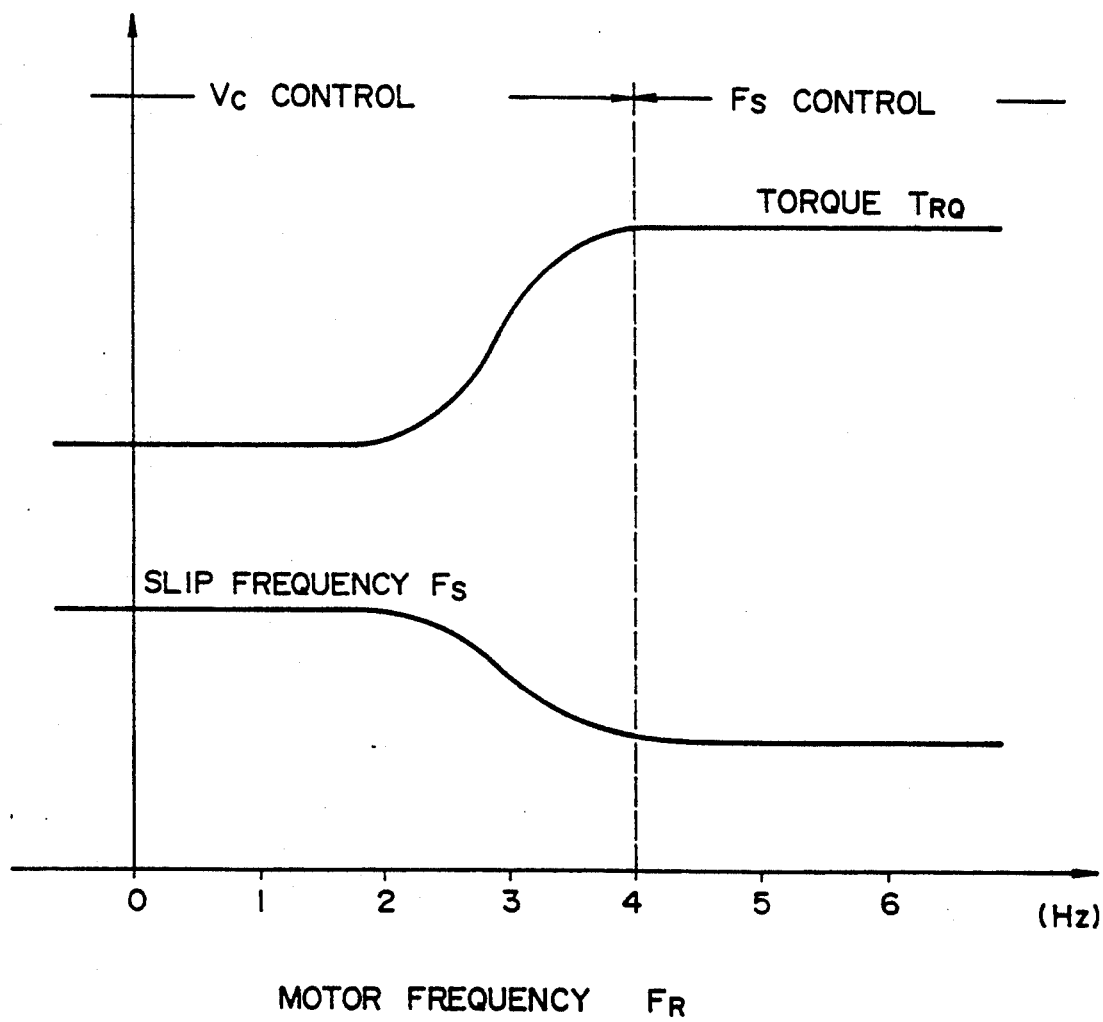
FIG. 18 is a graph showing the effect of a time constant element circuit or time delay circuit.

FIG. 18 shows a change of torque $T_{RQ}$ and a change of slip frequency $F_S$ in the case where the present temperature T is lower than the reference temperature $T_0$. In the shown example, when a motor frequency $F_S$ is about 2 Hz, a correction factor is calculated so that change-over between control systems is effected with a time difference or time delay until the time of change-over (4 Hz in this case) by a delay circuit 32. According to the present embodiment, a device free of a variation of torque upon change-over can be provided without adding a new component such as a temperature sensor.

Figure 16:
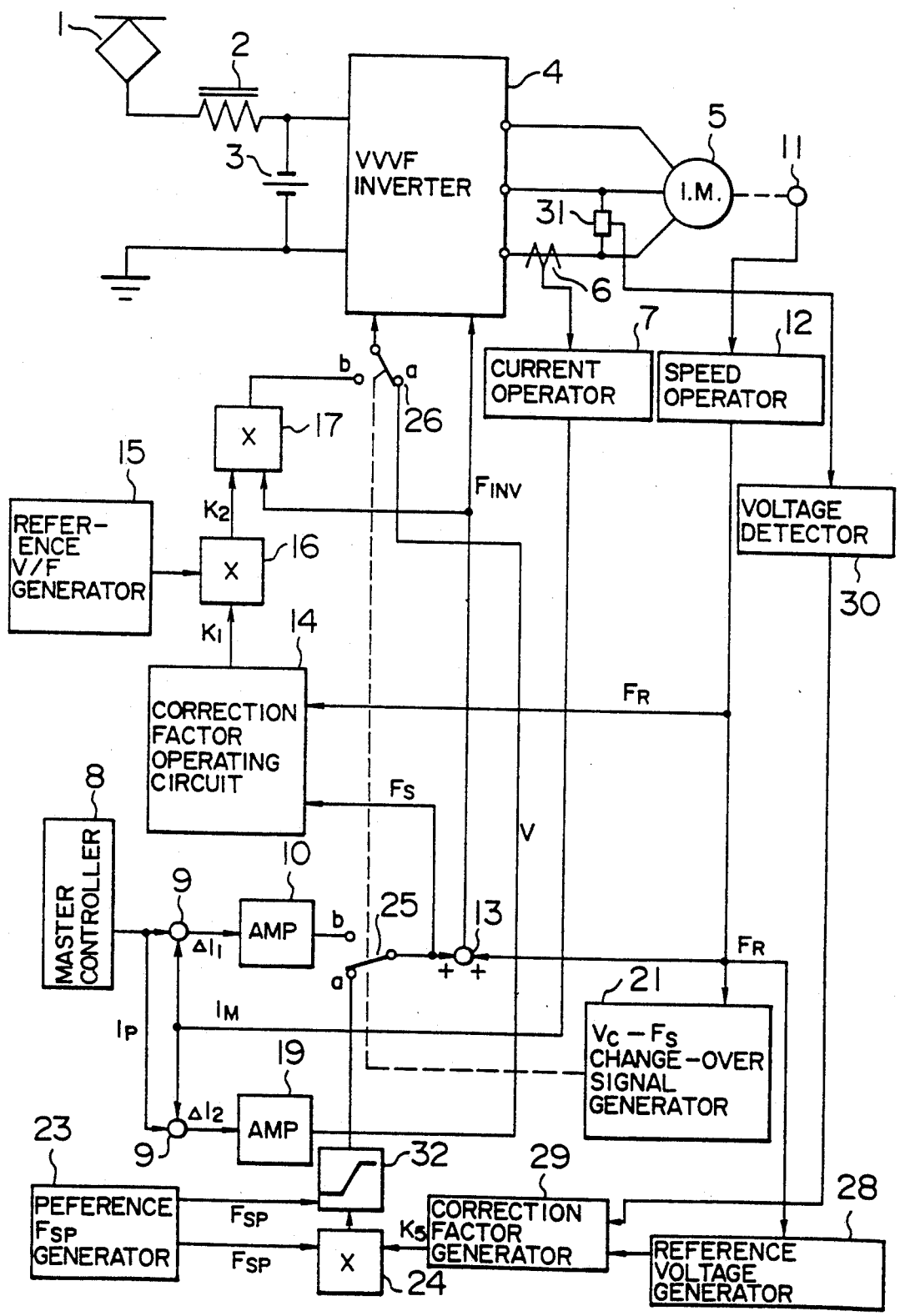
FIG. 16 is a block diagram of a furthermore embodiment of the present invention which involves a change-over between control systems.

Another embodiment will be explained by virtue of FIG. 16. In FIG. 16, the same reference numerals as those used in FIG. 15 designate the same parts or components shown in FIG. 15.

The construction of FIG. 16 is different from that of FIG. 15 in that a motor voltage V is detected by an induction motor line voltage detector 31 and a motor voltage detector 30.

By the way, the motor voltage changes in a range from 0 V to 1500 V. The motor voltage upon $V_C$ control is 0 V to about 50 V and a change of voltage depending upon temperature is several volts. If the detectors 30 and 31 are provided by ones which take the gauge of 1500 V or more, it is difficult to measure the voltage change of several volts. However, if the detectors 30 and 31 are provided by ones having a gauge in which a voltage when the change-over is made from the $V_C$ control to the $F_S$ control is taken as the maximum voltage (for which a certain margin may be permitted), it is possible to accurately measure the voltage change depending upon temperature.

The above similarly holds for a voltage V (or modulation rate $\gamma$) which is the output of the amplifier 19 shown in FIG. 15.

According to the embodiments shown in FIGS. 15 and 16, it is not necessary to directly measure the temperature by use of a temperature sensor. It is difficult to attach a temperature sensor to the interior of a motor. Therefore, if temperature sensors are used, the motor surface temperature and the ambient temperature must be measured to finely estimate the internal temperature for each motor. In the present embodiments, it is not necessary to preliminarily measure temperatures.

We claim:

1. A control device for inducting motor comprising:
   a variable-voltage variable-frequency inverter for converting a direct current into an alternating current;
   an induction motor driven by said motor;
   means for controlling a slip frequency so that a current of said induction motor becomes constant;
   means for outputting an inverter frequency by addition and subtraction of said slip frequency and a rotational frequency of said motor;
   means for generating an inverter output voltage command proportional to said inverter frequency; and
   means for calculating a sinusoidal value of a phase difference between an input voltage and a current of said motor from said slip frequency and said rotational frequency of said motor, and for compensating said inverter output voltage command according to said sinusoidal value.

2. A control device for induction motor comprising:
   a variable-voltage variable-frequency inverter for converting a direct current into an alternating current;
   an induction motor driven by said inverter;
   a voltage control system including means for controlling an output voltage of said inverter so that a current of said induction motor takes a constant value, a temperature sensor attached to said induction motor, means for outputting a ratio of an output of said temperature sensor to a predetermined value and means for correcting a reference slip frequency in accordance with said ratio;
   a slip frequency control system including means for controlling a slip frequency so that the current of said induction motor becomes constant and means for correcting a voltage proportional to an inverter frequency in accordance with an internal impedance angle of said induction motor; and
   means for making a change-over between said voltage control system and said slip frequency control system when a rotation frequency of said induction motor takes a predetermined value.

3. The control device for induction motor according to claim 2, wherein said means for correcting said voltage in accordance with said internal impedance includes means for receiving said slip frequency and the rotation frequency of said induction motor to calculate an impedance angle and means for calculating a correction factor in accordance with said impedance angle.

4. The control device for induction motor according to claim 3, wherein said correction factor calculating means includes means for dividing a predetermined value by a sine value of said impedance angle.

5. The control device for induction motor according to claim 2, wherein said means for correcting said voltage in accordance with said internal impedance angle includes means in which the value of a correction factor preliminarily operated in accordance with said impedance angle is stored as a function of said inverter frequency and which outputs said correction factor is accordance with the inverter frequency.

6. A control device for induction motor comprising:
   a variable-voltage variable-frequency inverter for converting a direct current into an alternating current;
   an induction motor driven by said inverter;
   a voltage control system including means for controlling an output voltage of said inverter so that a current of said induction motor takes a predetermined value, a temperature sensor attached to said induction motor, means for outputting a ratio of an output of said temperature sensor to a predetermined value and means for correcting a reference slip frequency in accordance with said ratio;
   a slip frequency control system including means for controlling a slip frequency so that the current of said induction motor becomes constant and means for correcting a voltage proportional to an inverter frequency in accordance with a power factor of said induction motor; and
   means for making a change-over between said voltage control system and said slip frequency control system when a rotation frequency of said induction motor takes a predetermined value.

7. A control device for induction motor comprising:
   a variable-voltage variable-frequency inverter for converting a direct current into an alternating current;
   an induction motor driven by said inverter;
   a voltage control system including means for controlling an output voltage of said inverter so that a current of said induction motor takes a predetermined value, a temperature sensor attached to said induction motor, means for outputting a ratio of an output of said temperature sensor to a predetermined value and means for correcting a reference slip frequency in accordance with said ratio;
   a slip frequency control system including means for controlling a slip frequency so that the current of said induction motor becomes constant and means for correcting a voltage proportional to an inverter frequency in accordance with the sine of a phase difference between said voltage and the current of said induction motor; and
   means for making a change-over between said voltage control system and said slip frequency control system when a rotation frequency of said induction motor takes a predetermined value.

8. A control device for induction motor comprising:

a variable-voltage variable-frequency inverter for converting a direct current into an alternating current;

an induction motor driven by said inverter;

a voltage control system including means for controlling an output voltage of said inverter so that a current of said induction motor takes a predetermined value, means for generating a reference voltage corresponding to a rotation frequency of said induction motor and means for correcting a reference slip frequency in accordance with an input voltage of said induction motor and said reference voltage;

a slip frequency control system including means for controlling a slip frequency so that the current of said induction motor becomes constant and means for correcting a voltage proportional to an inverter frequency in accordance with the sine of a phase difference between said voltage and the current of said induction motor; and means for making a change-over between said voltage control system and said slip frequency control system when the rotation frequency of said induction motor takes a predetermined value.

9. A control device for induction motor according to claim 8, wherein said reference slip frequency correcting means is provided with means for effecting the transition from a slip frequency before correction to a slip frequency after correction with a predetermined time delay.

* * * * *